Figure 1:
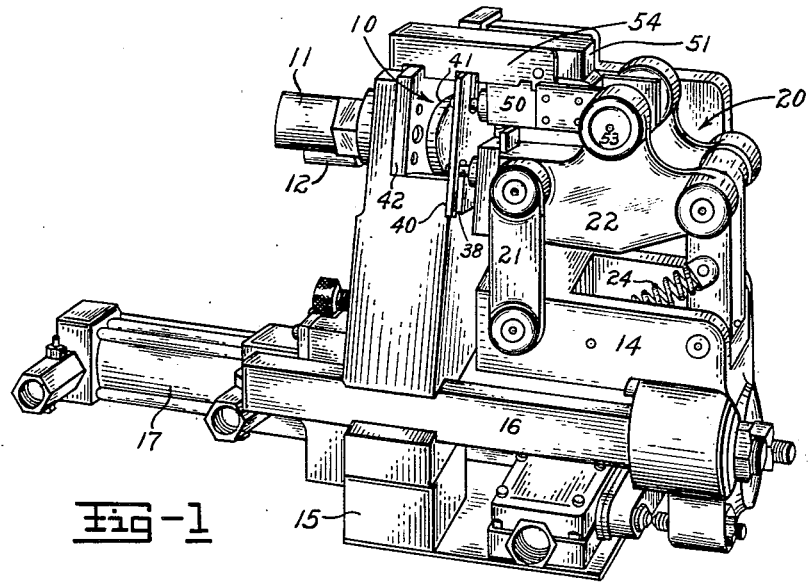

March 19, 1957 R. L. ESKEN 2,785,799
GAUGING DEVICE
Filed Feb. 11, 1955 3 Sheets-Sheet 1

INVENTOR.
Robert L. Esken
BY
Edward J. Noip
atty

March 19, 1957 R. L. ESKEN 2,785,799
GAUGING DEVICE
Filed Feb. 11, 1955 3 Sheets-Sheet 2
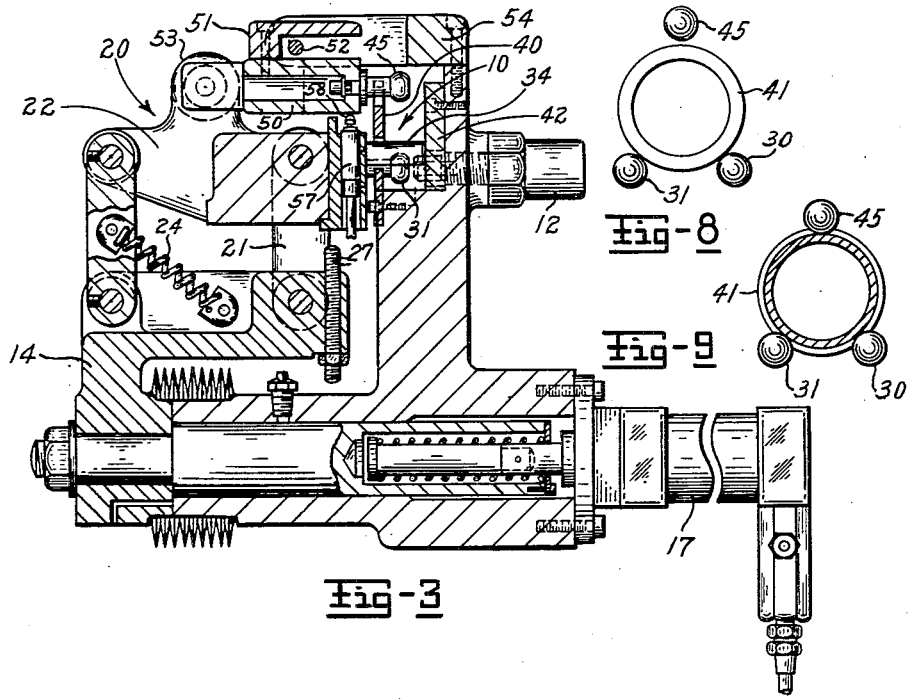
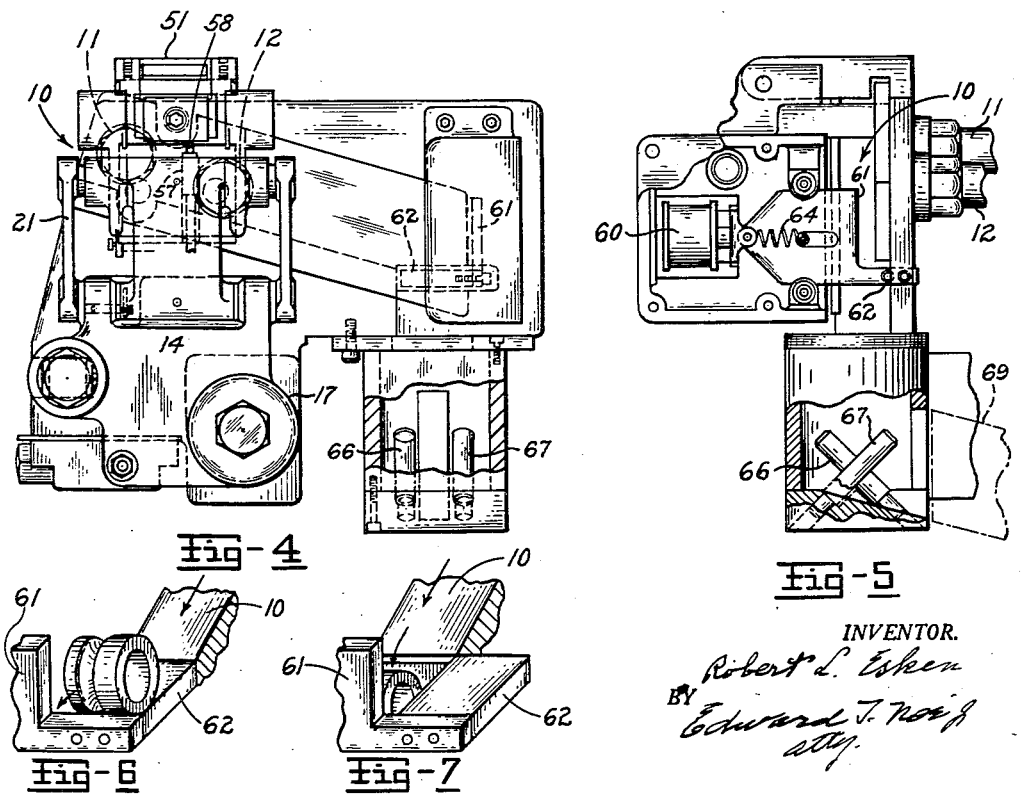
INVENTOR.
Robert L. Esken
BY Edward J. Noe
atty.

March 19, 1957 R. L. ESKEN 2,785,799
GAUGING DEVICE
Filed Feb. 11, 1955 3 Sheets-Sheet 3
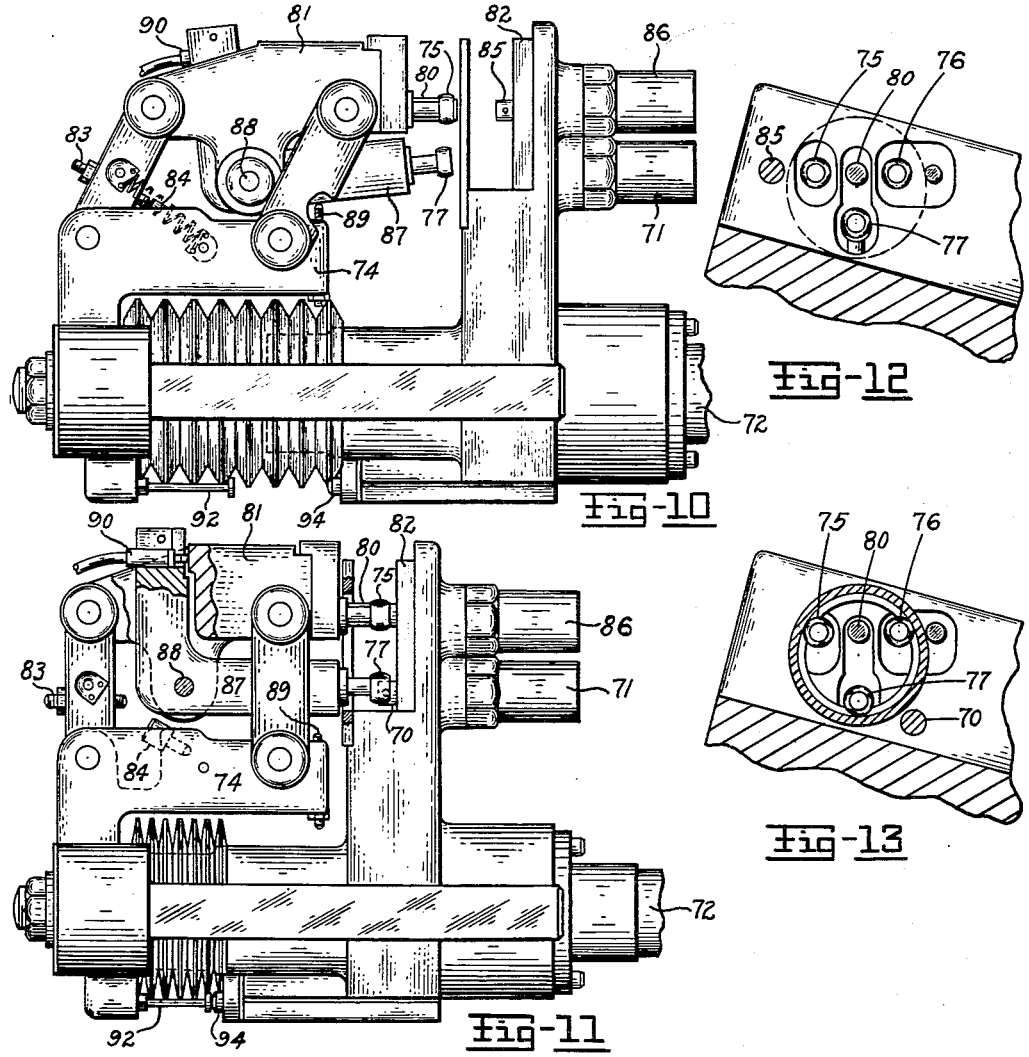
INVENTOR.
Robert L. Esken
BY Edward T. Noe Jr.
atty.

United States Patent Office 2,785,799
Patented Mar. 19, 1957

2,785,799

GAUGING DEVICE

Robert L. Esken, Dayton, Ohio, assignor to The Sheffield Corporation, Dayton, Ohio, a corporation of Ohio Application February 11, 1955, Serial No. 487,644

14 Claims. (Cl. 209—88)

This invention relates to gauging apparatus and more particularly to an apparatus for gauging the raceways of ball bearing races.

It is an object of this invention to provide an apparatus for gauging dimensional characteristics such as the diameter of a ball bearing raceway wherein gauging means are carried to clear a part projection such as a raceway shoulder and then automatically move toward and into gauging association with the surface to be gauged, the gauging means being responsive to dimensional characteristics of the surface and adapted for controlling an indicator of a segregating mechanism or a machine control in accordance with the gauging results obtained.

It is a further object to provide a gauge for checking bearing races or the like in which several gauging members are first moved axially of the work to be gauged and until a stop is encountered whereupon the members are moved toward and from the surface to be gauged.

It is a further object to provide an apparatus wherein a carrier is moved axially of a raceway or the like to be gauged while carrying a gauging assembly extending forwardly relative thereto on parallel links, the forward movement of the gauging assembly being limited when gauging contacts included therein arrive in the raceway plane, following which the contacts move toward the raceway and into gauging contact therewith in response to relative separation between the carrier and the assembly during continued movement of the carrier in the same direction, whereby accurate gauging of such a part surface is obtained in apparatus which is simple and rugged in construction and reliable for continued accurate gauging through a long service life.

It is a further object to provide an apparatus for precisely gauging the diameters of bearing raceways as the races are ejected from a raceway grinding machine, the apparatus providing a rugged gauging structure for automatically gauging in a cyclic manner the raceway dimensions and for segregating the races in accordance with their gauged characteristics, the gauging signal obtained being applicable to an indicator, a segregating mechanism, or for controlling the grinding machine itself.

It is a further object to provide an apparatus for turning a part during its movement by gravity through a gauging system or the like wherein, selected parts are dropped onto a pair of spaced members having oppositely inclined upper surfaces lying in planes transverse the former direction of progress whereby the part is turned 90° as it drops therebetween.

Figure 2:
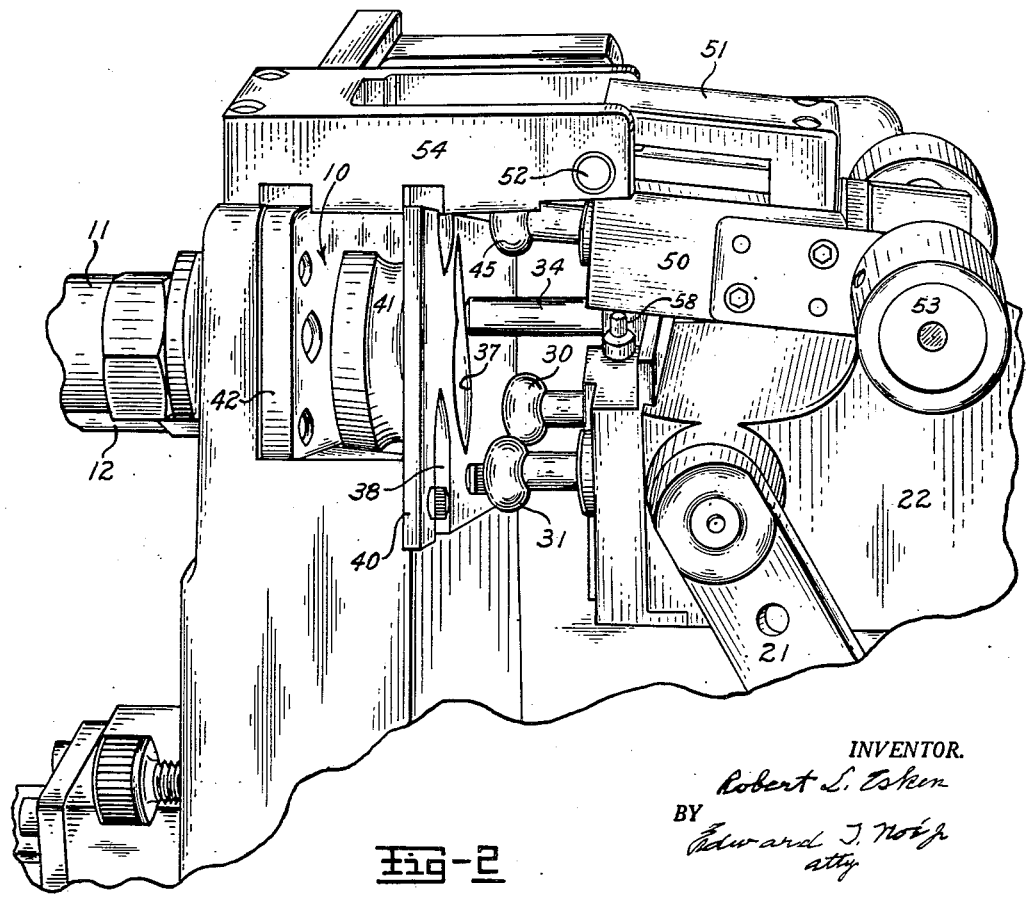

Other objects and advantages of the invention will be apparent from the following description, the appended claims, and the accompanying drawings, in which, Figure 1 is a view in perspective of an apparatus embodying the features of the present invention adapted for gauging the diameter of the raceway of an inner bearing race, Figure 2 is an enlarged view of a portion of the apparatus of Figure 1, illustrating the gauging contacts in expanded condition, Figure 3 is a view in central section of the apparatus of Figures 1 and 2, Figure 4 is a side view in elevation of the apparatus, Figure 5 illustrates in partial section the mechanism for segregating the races following gauging, Figures 6 and 7 illustrate schematically the segregating mechanism in different positions, Figures 8 and 9 are diagrammatic representations respectively of the positions of the gauging contacts as they move into the raceway plane and as they are positioned during gauging, Figures 10 and 11 are side views, in elevation, of a second embodiment of the invention for gauging the diameter of the raceway of an outer bearing race, the apparatus being shown in its closed and retracted position in Figure 10 and as extended forward and expanded for gauging in Figure 11, Figures 12 and 13 illustrate the operation of the gauging contacts and escapement mechanism and their relationship to the work receiving chute, and Figure 14 is a diagrammatic representation of an air circuit for operating the apparatus.

The particular apparatuses illustrated for the purpose of disclosing the present invention are provided for gauging the diameters of inner and outer bearing raceways. It will be understood, however, that the present invention is not limited to such applications nor is it limited to the specific structural details illustrated.

In each of the specific apparatuses illustrated races are received from a grinding machine or the like and are located for gauging at the upper end of an inclined chute. A gauging carrier is mounted for movement transverse to the chute and parallel to the axis of the race to be gauged. The carrier supports a gauging assembly, the gauging assembly being connected to the carrier by means of a plurality of parallel links of equal length biased in forward inclined positions to close the assembly toward the carrier when the carrier is in a retracted position. As the carrier moves forwardly in gauging, it moves gauging contacts within the gauging assembly over the adjacent shoulder of the race. As the contacts arrive in the raceway plane the forward movement of the assembly is limited and during continued forward movement of the carrier, as the assembly is expanded relative thereto through rocking of the links, the gauging contacts are moved substantially within the plane of the raceway toward the raceway and into engagement therewith. Gauging means in the assembly are responsive to the relative positions of the contacts and to the diameter of the raceway gauged. In the illustrated apparatus this gauging means constitutes a fluid leakage orifice unit adapted for connection to an indicator and, through means of an air-electric transducer, to controlling segregating mechanism and for controlling a grinding machine or the like in accordance with the gauging results obtained, as exemplary applications.

The apparatus of Figures 1 to 9 is provided for gauging the diameter of the raceway of an inner bearing race. In its operation, gauging contacts are carried in an expanded condition over the adjacent raceway shoulder and are then moved in toward one another into contact with the raceway to be gauged. Races are received for gauging in an inclined chute 10 and are initially held in position above the gauging zone by means of an escapement plunger projected into the chute by a piston within the uppermost cylinder 11 of a pair of escapement cylinders 11 and 12. A gauging carrier 14 is guided on base 15 by means of a guide bar 16 and is actuated for movement parallel to the axis of a race to be gauged by an actuating air cylinder 17. Prior to forward movement of carrier 14 the escapement plungers are reversed and the plunger of cylinder 12 locates the race for gauging.

A gauging assembly 20 is carried above the carrier by means of a plurality of spaced, parallel links of equal length, one of which is indicated at 21. When the carrier 14 is in retracted position the gauging body 22 is rocked forwardly and closed toward the carrier by a spring bias 24 acting between one of the links 21 and the carrier. The apparatus is shown in its retracted position in Figure 2. The closed position of body 22 relative to carrier 14 is limited by means of an adjustable screw projection 27, seen in Figure 3.

A pair of part spherical gauging contacts 30 and 31 are fixedly mounted on the forward face of body 22 as is a stop projection 34. As the carrier 14 is actuated for movement forward toward gauging position body 22 is carried therewith to move contacts 30 and 31 through openings 37 and 38 in chute side wall 40 below the race and over the adjacent shoulder thereof. When contacts 30 and 31 arrive in the plane of the raceway projection 34 engages the far wall 42 of the chute and the forward movement of the gauging assembly body 22 is stopped. During continued forward movement of carrier 14, links 21 are rocked to expand body 22 relative to carrier 14 and to move it upwardly carrying contacts 30 and 31 in the plane of the raceway and into engagement therewith, also lifting the race slightly from the chute floor and escapement plunger.

Simultaneously, gauging contact 45 is moved into the raceway plane and into engagement with the raceway in opposition to contacts 30 and 31. The gauging contacts are moved into engagement with opposite sides of the raceway and, when three contacts are utilized as illustrated, they preferably engage the raceway at substantially equal spacing thereabout. Contact 45 is carried by an arm 50 pivoted at 53 on body 22. Arm 50 is actuated by a guide bracket 51 which extends about a pin 52 with clearance. Pin 52 is fixedly mounted on the base 15 by means of a support 54. In Figure 2 arm 50 is shown rocked upwardly through the cooperation of bracket 51 with pin 52 when the carrier 14 is in its retracted position. As carrier 14 moves forwardly, bracket 51 slides along pin 52 retaining contact 45 in its raised position to move over the race shoulder. When forward movement of body 22 is stopped by engagement of projection 34 with chute wall 42, body 22 raises, raising pivot 53 at the rearward end of arm 50 thus swinging the arm about the pin 52 and allowing the lowering of contact 45 substantially within the raceway plane and into engagement therewith. Bracket 51 has substantial clearance relative to pin 52 in order that contact 45 will be freely located relative to contacts 30 and 31 in accordance with the race dimension gauged. During gauging the escapement plunger associated with cylinder 12 is extended into the chute below the gauging zone and the upper plunger is retracted.

A gauging cartridge 57 of the air leakage type (see Figure 3) is supported on body 22 and is bodily positioned upon engagement of contacts 30 and 31 with one side of the raceway. The work contactor 58 of the cartridge engages gauging arm 50. Accordingly the leakage through the cartridge is controlled in accordance with the relative positions of the gauging contacts and the diameter of the raceway being gauged. While any suitable gauging means can be employed, the particular type illustrated may be of the nature disclosed in Patent No. 2,691,827, issued October 19, 1954.

Following completion of gauging the piston within cylinder 17 is reversed to move the carrier 14 and the gauging assembly 20 in the reverse direction. Body 20 will be initially lowered to expand the gauging contacts within the raceway plane, following which the entire gauging assembly will retract to its initial position, the escapement plungers reversing and releasing the race to allow its movement down the inclined chute 10. The cycle is thus completed. Fluid pressure changes responsive to the controlled leakage through cartridge 57 can be applied to an air-electric transducer such as that disclosed in Patent No. 2,448,653, issued September 7, 1948, and through an electrical control circuit not disclosed to actuate a solenoid 60.

Solenoid 60 operates a selection arrangement including a stop surface 61 and a trap door 62. When a satisfactory part has been gauged, solenoid 60 is energized to move the selection arrangement against the tension of spring 64 to a position as shown in Figure 6. The race then moves down the inclined chute 10 across the trap door 62 and outward toward the observer as seen in Figure 5. Should the dimension of the raceway not meet the required tolerances, the selection arrangement is held in an extended position by spring 64. This position is indicated in Figure 7. The race then passes down chute 10, is stopped by projection 61, and drops through past trap door 62. A rejected race drops into engagement with a pair of inclined turning bars 66 and 67 which twist the race 90° as it falls therebetween following which it moves out of the apparatus along a chute 69 and to the right as seen in Figure 5. This provides a simple and rugged system for turning such parts.

Figures 8 and 9 illustrate diagrammatically the positions of the gauging contacts. In Figure 8 they are illustrated as expanded for movement over the race shoulder and into the plane of the raceway. In Figure 9, they are closed against the raceway of race 41 for gauging.

Figures 10 through 13 illustrate a second embodiment of the present invention provided for gauging the diameter of the raceway of an outer ball bearing race. In this application as a race is received in the chute it is stopped by an escapement plunger 85 actuated by a piston within escapement cylinder 86. Before carrier 74 moves forward the escapement plungers reverse and the race is located for gauging by plunger 70 extended by a piston within cylinder 71. As carrier 74 moves forward toward gauging position, gauging contacts 75, 76 and 77 are carried forward over the adjacent shoulder of the race and into the plane of the raceway in a closed position as disclosed in Figure 12. A projecting limit bar 80 carried by gauging body 81 engages the opposite wall 82 of the receiving chute to limit the forward movement of body 81.

During continued forward movement of carrier 74 gauging contacts 75 and 76 are moved upwardly with body 81 into engagement with the raceway as shown in Figure 13. The third gauging contact 77 is carried at the forward end of a bellcrank 87 pivoted at 88 on body 81. When carrier 74 is in its retracted position and body 81 and carrier 74 are closed together bellcrank 87 is rocked by engagement with an adjustable limit projection 89 to maintain contact 77 in a raised position. In the retracted position the relative closing of body 81 and carrier 74 is limited by engagement of an adjustable projection 83 on one of the interconnecting links with stop 84 on carrier 74. Contact 77 moves with contacts 75 and 76 over the raceway shoulder as seen in Figure 12 and during the expansion of body 81 relative to carrier 74 moves substantially within the plane of the raceway into engagement with the opposite side thereof as its pivot axis 88 is raised.

A gauging cartridge 90 of the character previously referred to is carried at the inner end of bellcrank 87 and its work contactor engages a surface on body 81. As body 81 and bellcrank 87 are relatively positioned by engagement of contacts 75, 76 and 77, respectively, with opposite sides of the raceway, the body and work contactor of cartridge 90 will also be relatively positioned in accordance with the diameter of the raceway gauged. The variable fluid leakage obtained can be applied to actuate indicators, segregating mechanism, machine controls and for like functions.

During reverse movement of carrier 74 the sequence of operation is substantially the reverse of that previously described. The carrier is actuated for the forward and reverse movement by a piston within air cylinder 72. At its inward position an adjustable projection 92 on carrier 74 engages a switch plunger 94, giving an electric signal for use in a gauging, segregating or machine control circuit.

A simple air system for automatically actuating the escapement plungers and actuating piston in this latter embodiment is diagrammatically illustrated in Figure 14. A similar system is employed in the modification of Figures 1 to 9. This air circuit is especially adapted for use when the gauging apparatus is associated with a grinder for grinding the raceways being gauged. In order that a raceway be gauged while another is being ground this system is actuated in response to movements of the wheel head slide of the grinder, gauging while the grinder is in its forward position and releasing the gauged part and accepting another as the wheel head retracts.

The air circuit of Figure 14 actuates the escapement plungers 70 and 85 and the carrier 74 in response to movement of the wheel head slide of a grinder for grinding the bearing raceways. The circuit is shown in Figure 14 in a condition wherein the wheel head slide is retracted to loading position a wheel head portion 102 conditioning valve 101 as shown. Carrier 74 and escapement plunger 70 are also retracted while escapement plunger 85 is extended into the chute for engagement with the race just ground. This condition of the apparatus components is illustrated in Figures 10 and 12. When the wheel head slide moves forward toward grinding position, slide portion 102 actuates valve 101 and the escapement plungers 70 and 85 are immediately reversed, extending plunger 70 into the chute to receive and locate the bearing race for gauging. After a predetermined time delay pilot 104 shifts carrier control valve 105 and a piston within cylinder 72 is actuated to move carrier 74 forward toward gauging position. As carrier projection 92 strikes switch 94 gauging takes place and the components are then in condition of Figures 11 and 13 during gauging. Upon completion of the grinding operation upon a race the wheel head retracts and valve 101 returns to the condition of Figure 14, retracting carrier 74 and reversing the escapement plungers to release the race just gauged and return the apparatus to the condition of Figures 10 and 12. It will be noted in Figure 13 that during gauging the race is lifted from the floor of the chute and away from the escapement plunger 70 upon raising of gauging contact 75 and 76. This is a condition which is true with both embodiments during gauging, insuring that gauging accuracy is not affected by engagement of the race with any component other than the three gauging contacts.

Thus it is seen that an apparatus has been provided for gauging dimensions such as the diameter of a bearing raceway. The apparatus is ruggedly constructed and is reliable for repeated gauging operations through a long service life. Provision has been made for receiving and locating a part in gauging position and for moving gauging contacts into engagement therewith through a unique movement allowing the gauging of parts of difficult configuration. The apparatus is adapted for cyclic gauging in response to the movements of a machine producing the parts to be gauged and has provision for segregating the parts in accordance with the gauging results.

While the forms of apparatus herein described constitute the preferred embodiment of the invention, it is to be understood that this invention is not limited to these precise forms of apparatus, and that changes may be made therein without departing from the scope of the invention which is defined in the appended claims.

What is claimed is:

1. A bearing race gauging apparatus comprising a base, means on said base for receiving and locating a race to be gauged, gauging contacts for engagement with opposite sides of a raceway during gauging, carrying means supported on said base for movement to carry said gauging contacts generally parallel to the race axis, over the adjacent race shoulder and to limited forward positions substantially in the plane of the raceway, said carrying means automatically including actuating means operative upon arrival of the gauging contacts in the raceway plane to relatively move the gauging contacts toward the raceway and into gauging contact therewith, and gauging means responsive to the relative positions of the contacts when in engagement with the raceway.

2. Apparatus for gauging a work surface such as a bearing raceway, said apparatus comprising work receiving means, a gauging body carried for movement from a retracted position forward toward said receiving means, a gauging member carried by said body for movement therewith and relative thereto, gauging means carried by said member for association with a work surface to be gauged, means for stopping forward movement of the gauging member when the gauging means are adjacent the surface to be gauged, and means cooperating between said body and said member operative to move the gauging means toward the work surface and into gauging association therewith in response to continued forward movement of said body relative to said member.

3. Apparatus for gauging a work surface such as a bearing raceway, said apparatus comprising work receiving means, a gauging body carried for movement from a retracted position forward toward said receiving means, a gauging block carried by said body for movement therewith and relative thereto, gauging contacts fixed at the forward end of said block for engagement with one side of the work to be gauged, an arm pivotably mounted on said block, a gauging contact at the forward end of said arm for engagement with the opposite side of the work, means for stopping forward movement of the block when the gauging contacts are adjacent thereto, actuating means in said apparatus responsive to continued forward movement of the body relative to said block and operatively associated with the block and said gauging arm for moving said contacts into engagement with the work, a fluid leakage orifice unit cooperating between said block and said arm responsive to relative positions of said contacts and the work dimension, and means connected to said unit adapted for connection to a source of air under pressure and an air gauge.

4. An apparatus for gauging dimensional characteristics such as the diameter of a bearing raceway, said apparatus comprising work receiving means, a gauging body carried for gauging movement from a retracted position forward toward said receiving means, a gauging block, lever means connected between said body and said block, means biasing said block to rock said lever means and block to a limited forward position relative to said gauging body, gauging contacts carried by said block for engagement with the work to be gauged, drive means connected to said body for forward movement of the body and the block toward gauging position, stop means for limiting the forward movement of said block when the gauging contacts are adjacent the work portion to be gauged, and actuating means in said apparatus operatively associated with said gauging contacts responsive to relative rocking movement of said block on said body during continued forward movement of said body for then moving the contacts toward the work surface and into gauging contact therewith.

5. A bearing race gauging apparatus comprising a base, an inclined chute on said base for receiving a race to be gauged, locating means extensible into said chute to limit the movement of the race down the chute and to locate it for gauging, a plurality of gauging contacts, carrying means supported on said base for movement toward the adjacent wall of the chute and operative to carry said gauging contacts along the axis of the race, over the adjacent race shoulder and to a limited forward position in the plane of the raceway, said carrying means including actuating means operative upon arrival of the gauging contacts within the chute and in the plane of the raceway to move the contacts towards the adjacent raceway surfaces and into gauging contact therewith, and gauging means responsive to the relative position of the contacts when in engagement with the raceway and the dimensional characteristics thereof.

6. The apparatus of claim 5 wherein said gauging means includes a controllable fluid leakage orifice unit, and means connected to said unit adapted for connection to a source of air under pressure and a gauge.

7. A bearing race gauging apparatus comprising a base, means on said base for receiving and locating a race for gauging, a gauging body carried for rectilinear gauging movement from a retracted position along the race axis and forward toward said receiving means, a gauging block, parallel links of equal length pivotally connected between said body and said block, whereby the relative spacing between the body and block in a direction transverse the line of gauging movement varies with the relative positions therebetween along that line, means biasing said block to rock said links and block to a limited forward position relative to said gauging body, first contact means fixed at the forward end of said block for engagement with one side of a raceway to be gauged, second contact means for engagement with the opposite side of the raceway, means connected to said body for forward movement of the body and block toward gauging position, stop means for limiting the forward movement of said block when the gauging contacts are in the plane of the raceway to be gauged, whereby the first contact means are carried into engagement with said one side of the raceway in response to relative separation of the body and block transverse the line of gauging during continued forward movement of said body, and actuating means in said apparatus responsive to said relative transverse movement for carrying the second contact means into engagement with the opposite side of the raceway, whereby the gauging contacts are moved along the axis of the race and over the adjacent shoulder thereof during the concurrent gauging movement of the body and block and are moved transversely thereof into engagement with the raceway during the continued forward movement of the body beyond the limited position of the gauging block, limit means on said base for stopping the continued forward movement of said body, and gauging means responsive to the relative positions of said first and second contact means and to the dimensional characteristics of the raceway.

8. A bearing race gauging apparatus comprising a base, means on said base for receiving and locating a race in gauging position, a carrier supported on said base for movement along a line substantially parallel to the axis of the race to be gauged and from a retracted position forward toward said locating means, an upper gauging block, a plurality of parallel links of equal length pivotally connected between said body and said block, limit means biasing said block to rock said links and said blocks to a limited forward position on said carrier, a gauging arm pivotably mounted on said block, gauging means cooperating between said arm and said block, first contact means at the forward end of said arm for engagement with one side of the bearing raceway, second contact means at the forward end of said block for engagement with the opposite side of the raceway, means connected to said carrier for forward movement of said carrier and block toward gauging position to carry said contact means along the axis of the race, over the adjacent race shoulder and into the plane of the raceway, cooperating stop means on said block and said base to limit the forward movement of the block when the contact means are in the plane of the raceway and allowing vertical movement of the block as the carrier continues its rectilinear forward movement, whereby the second contact means are carried upward into engagement with one side of the raceway, and actuating means responsive to the vertical movement of the block for lowering the first contact means into engagement with the opposite side of the raceway and to position the gauging arm, whereby the contact means are moved substantially within the raceway plane into engagement with the raceway for gauging and the gauging means is responsive to the raceway diameter.

9. An apparatus for gauging the diameter of the raceway of an outer bearing race, said apparatus comprising a base, means on said base for receiving and locating the race to be gauged, a gauging carrier, means on said base supporting said carrier for rectilinear movement forward from a retracted position toward said receiving means and along a line substantially parallel to the axis of the race to be gauged, an upper gauging block, a plurality of parallel links of equal length pivotably connected between said carrier and said block, resilient means in said apparatus biasing said block to a forward limited position to close said block downward toward said carrier with said links inclined forwardly relative to the gauging carrier, a gauging arm mounted on said block for pivoting movement about an axis transverse the line of carrier movement, first gauging contact means at the forward end of said arm, second contact means at the forward end of said block supported above said first contact means, a locator on said carrier engageable with said gauging arm at a point between its pivot axis and the first contact means determining a pivoted position of said arm when the block is closed toward the carrier wherein the first contact means are adjacent the second contact means, means connected to said carrier for forward movement of the carrier and block to carry the contact means along the axis of the race, over the adjacent race shoulder and to a forward position substantially in the plane of the raceway, cooperating stop means on said block and base to limit the forward movement of the block when the contact means are in the raceway plane and allowing vertical movement of the block relative to said carrier and an expansion therebetween during continued forward movement of the carrier, whereby the second contact means are moved upwardly into engagement with one side of the raceway and the second contact means is lowered into engagement with the opposite side of the raceway as the gauging arm pivot axis is raised to lift the arm from the locator, and gauging means cooperating between the arm and block responsive to the diameter of the raceway.

10. An apparatus for gauging the diameter of a raceway of an inner bearing race, said apparatus comprising a base, means on said base for receiving and locating a race to be gauged, a gauging carrier, means supporting said carrier on said base for movement from a retracted position forward toward said locating means, an upper gauging block, a plurality of parallel links of equal length pivotally connected between said carrier and said block, means in said apparatus operative to bias said block to a forward closed position adjacent said carrier with said links inclined forward relative to said carrier, a gauging arm mounted on said block for pivoting movement relative thereto about an axis extending transverse the direction of carrier movement, first gauging contact means fixed at the forward end of said gauging arm, second contact means fixed at the forward end of said block below said first contact means, pivot means on said base cooperating with said gauging arm to lower said first contact means toward the second contact means as the block and carrier are relatively expanded and to separate the contact means as the block and carrier are closed together, means connected to said carrier for forward movement of the carrier and block in closed relationship toward gauging position to carry said contact means along the axis of the race and over the adjacent race shoulder, cooperating stop means on said block and said base to limit the forward movement of said block when the contact means are in the plane of the raceway and allowing vertical expansion of the block relative to the carrier as the carrier continues its forward movement, whereby said second contact means is raised into engagement with the lower side of the raceway and the first contact means is lowered into engagement with the opposite side thereof, and gauging means cooperating between said gauging arm and said block responsive to the relative positions of the contact means and to the raceway diameter.

11. Apparatus for turning a part during its movement by gravity through a distribution system, comprising a pair of turning members having oppositely inclined upper surfaces and adjacent surfaces lying in vertical planes, a first chute means leading to a point above said turning members and having provision for dropping a part moving by gravity down the chute onto the turning members with an extended dimension of the part across and spanning the member surfaces, the spacing between the members substantially equalling the dimension in vertical projection of the part transverse the extended dimension, whereby the part is turned as it drops downwards and between the turning members, and second chute means for receiving the part following its turning movement.

12. The apparatus of claim 11 wherein said turning members comprise a pair of cylindrical bars, oppositely inclined and lying in spaced vertical planes, the lower ends of the bars being supported and the upper ends free.

13. Apparatus for receiving, gauging and distributing bearing races, comprising a base, an inclined chute on said base adapted for receiving races for gauging and for rolling movement therealong, escapement means in said chute for locating a race for gauging, a carrier mounted on said base for movement transverse said chute, a gauging assembly carried by said carrier and including gauging contacts carried into the plane of the raceways upon forward movement of the carrier and assembly together and then within the plane of the raceway into engagement with the raceway, upon continued forward movement of the carrier relative to the assembly, gauging means responsive to the relative positions of the gauging contacts and the raceway diameter, a trap door in the floor of said chute below the gauging station actuated in response to said gauging means, turning means below said trap door, said turning means including a pair of oppositely inclined bars situated in spaced vertical planes transverse the inclined chute and therebelow, whereby a race dropped onto said bars is turned 90° as it moves downward therebetween, and receiving chutes one forming a substantial continuation of said inclined chute and the other for receiving races following their turning movement.

14. Apparatus for gauging a work surface such as a bearing raceway, said apparatus comprising work receiving and locating means, gauging means for association with a work surface to be gauged, carrying means for said gauging means supported for movement to carry the gauging means in one direction to and from a position adjacent the surface to be gauged, said carrying means including actuating means for moving the gauging means in another direction toward and from the work surface, and drive means operatively connected to said carrying and actuating means for moving said gauging means along said one direction adjacent the work surface and then in said other direction into association with the work surface for gauging and to reverse the sequence of movements to clear the part following gauging.

References Cited in the file of this patent
UNITED STATES PATENTS

| | | |
|---|---|---|
| 1,686,694 | Hauser et al. | Oct. 9, 1928 |
| 2,080,941 | Hutchinson | May 18, 1937 |
| 2,116,926 | Cramer | May 10, 1938 |
| 2,556,413 | Boosey | June 12, 1951 |
| 2,571,161 | Poole | Oct. 16, 1951 |
| 2,688,802 | Jones | Sept. 14, 1954 |